United States Patent [19]

Scholz

[11] 4,391,409
[45] Jul. 5, 1983

[54] POSITIONING AND CONTROL SYSTEM FOR FAN THRUST REVERSER COWLS IN A TURBOFAN ENGINE

[75] Inventor: Klaus H. Scholz, Renton, Wash.

[73] Assignee: The Boeing Company, Seattle, Wash.

[21] Appl. No.: 192,247

[22] Filed: Sep. 30, 1980

[51] Int. Cl.³ .............................................. F02K 1/60
[52] U.S. Cl. ................................ 239/265.29; 60/226.2
[58] Field of Search ................... 239/265.25–265.31; 60/226 A, 229, 263

[56] References Cited

U.S. PATENT DOCUMENTS

| | | | |
|---|---|---|---|
| 3,033,219 | 5/1962 | Erle | 137/100 |
| 4,030,291 | 6/1977 | Sargisson | 239/265.29 X |
| 4,191,094 | 3/1980 | Flippo | 60/226 A X |

Primary Examiner—Andres Kashnikow
Attorney, Agent, or Firm—Christensen, O'Connor, Johnson & Kindness

[57] ABSTRACT

A positioning and control system for fan thrust reverser cowls in a high bypass turbofan jet engine includes independent hydraulic actuator assemblies for selectively moving the cowls between a forward stowed position and a rearward deployed position. Hydraulic fluid is metered to the actuator assembly through matched, two-way, pressure compensated flow regulator valves associated respectively with each actuator assembly. The flow regulator valves are preferably interposed in the hydraulic lines of the rod end of the actuators so as to regulate the rate of translation of the thrust reverser cowls during both deployment and retraction. The use of matched flow regulator valves in parallel results in synchronous translation as well as substantially identical full stroke displacements of the reverser cowls during both deployment and retraction. Additionally, the use of matched flow regulator valves in parallel permits independent actuation of the thrust reverser cowl with lighter and more efficient actuator assemblies.

5 Claims, 6 Drawing Figures

POSITIONING AND CONTROL SYSTEM FOR FAN THRUST REVERSER COWLS IN A TURBOFAN ENGINE

BACKGROUND OF THE INVENTION

The present invention relates generally to hydraulic positioning and control systems and, more particularly, to positioning and control systems for thrust reverser cowls of turbofan jet engines.

High bypass turbofan jet engines of the type used on large commercial airplanes include a large rotatable turbofan coupled to the forward end of the central shaft of a turbine jet engine. The diameter of the turbofan is considerably greater than that of the jet engine immediately behind it. Rotation of the turbofan by the turbine engine causes the turbofan to produce a fan thrust by blowing air rearwardly around the outer surface of the turbine engine. The fan thrust thus augments the thrust of the turbine engine in powering the airplane. An outer fan housing or cowling encloses the turbofan and channels the fan thrust rearwardly along the outside of the engine.

During landing, and occasionally during taxing of the airplane, it is desirable to reverse the direction of the fan thrust to produce a braking action. Reversal of the fan thrust is accomplished by deployment of a pair of fan thrust reverser cowls which operate to deflect the rearwardly directed fan thrust from the turbofan to a forward direction. The fan thrust reverser cowls form part of the outer fan housing which encloses the turbofan. The reverser cowls are ordinarily semicylindrical in configuration (C-shaped in cross section) such that the two cowls combined form a tubular body sized to match the fan housing. The reverser cowls are normally maintained in a stowed position wherein they form a continuous, faired extension of the trailing edge of the fan housing.

During deployment, the reverser cowls are moved rearwardly of parallel sets of linear hydraulic actuators which connect the reverser cowls to the fan housing. As the reverser cowls are moved rearwardly, an annular gap is opened between the trailing edge of the stationary fan housing and the forward edges of the reverser cowls. The reverser cowls include airflow deflector panels, known as blocker doors, which form part of the inner surfaces of the reverser cowls in their stowed position and which swing inwardly from the inner surfaces as the reverser cowls are moved rearwardly. The blocker doors thus operate in deployment to obstruct the rearward flow of the fan thrust along the annular channel between the reverser cowls and the outer surface of the turbine engine. More specifically, the blocker doors deflect the fan thrust airflow outwardly in generally radial directions through the annular gap between the fan housing and the reverser cowls. The radially deflected airflow is further deflected into a forward direction by sets of forwardly directed airflow vanes which are affixed to the fan housing and are positioned in the gap between the trailing edge of the turbofan housing and the leading edges of the reverser cowls. Thus, the deployment of the thrust reverser cowls causes thrust from the turbofan to be deflected to a forward direction to thereby produce a braking action on the airplane.

Because of certain engine stability requirements and fan blade fatigue stress limitations, it is imperative that the two thrust reverser cowls be moved synchronously when they are being deployed or being retracted. Failure to maintain synchronous movement of the reverser cowls will result in uneven back pressures on the blades of the turbofan. Such uneven back pressures on the spinning turbofan results in high dynamic stresses which can cause damage or even failure of the turbofan.

Previous thrust reverser cowl deployment mechanisms have achieved synchronous movement by use of mechanical interconnections between the two cowls. Specifically, a flexible rotatable shaft has been used to connect the hydraulic actuators that drive the cowls. The flexible shaft was geared to the hydraulic actuators through worm gear assemblies so as to constrain the actuators, and therefore the reverser cowls as well, to move synchronously. This approach met the requirements of synchronous movement, but imposed a substantial weight penalty on the structure due to the weight of the mechanical linkages. Additionally, the mechanical interconnection of the reverser cowls generated installation difficulties, and also interfered with a cowl opening system so as to make it difficult to gain access to the engine for maintenance purposes.

Another problem with mechanically linking the two reverser cowls to achieve synchronous movement is that, in the event of jamming or binding of one cowl during the course of its rearward displacement, the full mechanical load exerted by the actuators of both reverser cowls is applied to the jam point. This creates the possibility of extensive damage to the fan housing and engine structure due to the substantial mechanical forces exerted to deploy the reverser cowls becoming focused on one point of the fan housing structure.

Accordingly, it has been sought to provide a hydraulic positioning system for the thrust reverser cowls that operates to move the cowls independently and yet also ensure synchronous motion of the cowls. As indicated above, independent actuation of the reverser cowls is desirable in order that less powerful actuators may be used to drive each reverser cowl to thereby reduce the maximum potential load on each cowl and thus reduce the possibility of extensive damage in the event of jamming.

Another requirement of a hydraulic positioning system for the reverser cowls is that the full displacement stroke of each cowl be identical even in the event of lagging of one cowl behind the other during deployment. Identical displacement strokes are necessary for the cowls to be properly positioned at the end of each translational movement in deployment or retraction. Although lagging of one cowl behind the other is sought to be avoided for the reasons discussed above, a small amount of lagging may be tolerated and must in fact be anticipated in the design of a suitable positioning system.

This requirement of identical displacement strokes has precluded the use of one conventional approach wherein separate hydraulic actuators drive the cowls and wherein a hydraulic flow divider having a pressure feedback mechanism selectively meters fluid to one hydraulic actuator or the other in the event of a pressure differential between the actuators. With such a system increasing resistance met by one cowl results in greater force being applied to that cowl. However, once a leading cowl becomes fully deployed the flow divider causes the lagging cowl to stall with the result that full deployment of the stalled reverser cowl is not achieved.

Another conventional hydraulic system that has been considered for positioning of the thrust reverse cowls is a servovalve mechanism. Such a mechanism includes a closed loop hydraulic system similar to a primary flight control system. The disadvantage of such a system is its greater complexity due to certain mechanical feedback assemblies which are required, as well as difficulties in rigging such a more complex system in the confined space of the fan housing.

Accordingly, it is an object and purpose of the present invention to provide a hydraulic positioning and control system for fan thrust reverser cowls in a turbofan engine.

It is also an object to provide a hydraulic positioning and control system that provides substantially synchronous translation of the thrust reverser cowls during deployment as well as during retraction.

It is another object of the present invention to provide a hydraulic positioning and control system that achieves the foregoing objects and purposes and which also ensures that the thrust reverser cowls undergo substantially identical full stroke displacements during deployment as well as retraction.

It is yet another object of the present invention to attain the foregoing objects with a hydraulic system that is reliable, simple, contains few moving parts, and which does not impose a significant weight penalty on the engine.

It is a further object of the present invention to provide a hydraulic positioning and control system for a pair of fan thrust reverser cowls whereby each cowl is independently driven to thereby reduce the extent of damage that might result from failure or jamming of a cowl during deployment or retraction.

SUMMARY OF THE INVENTION

In accordance with the present invention, a hydraulic positioning and control system for fan thrust reverser cowls in a turbofan engine includes an independent set of one or more double acting hydraulic actuators associated with each cowl for moving the cowl between a retracted, or stowed, position and a deployed position. Hydraulic fluid is selectively metered through a control valve connected to a primary hydraulic system to either the head ends of the rod ends of the actuators to effect deployment or retraction of the reverser cowls. Fluid flow through each set of actuators is regulated by a pressure compensated, two-way flow regulator valve associated with each cowl and its actuators. The flow regulator valves are preferably installed in the hydraulic lines connected to the common rod ends of the actuators of each cowl. Each flow regulator valve operates to constrain the flow rate of hydraulic fluid passing through the valve in either direction, to within a range of about ±5% from a nominal value over a relatively large range of pressure differentials across the valve. The flow regulator valves are matched to have substantially identical nominal flow rates.

Because of the constant and equal rates of flow of hydraulic fluid to the cowl actuators, the thrust reverser cowls are deployed and retracted synchronously and at constant translational rates. Each cowl is deployed to the end of its displacement stroke, even in the event of a slight lag of one cowl behind another. Likewise, during retraction of the cowls the return flow of fluid from the cowl actuators is regulated by the flow regulator valves to result in substantially constant and identical rates of translation. Again, each cowl is retracted to its fully stowed position even in the event of lagging of one cowl behind another.

The possibility of extensive damage in the event of jamming of one cowl is substantially reduced over previous mechanisms because the cowls are independently driven by their associated hydraulic actuators. Thus, the maximum potential load on each cowl is the force produced by its associated hydraulic actuators. Moreover, since there is no mechanical interconnection between the cowls, the system is lighter in weight and also more reliable and safe by reasons of having fewer moving parts.

DETAILED DESCRIPTION OF THE PREFERRED EMBODIMENT

Figure 1:
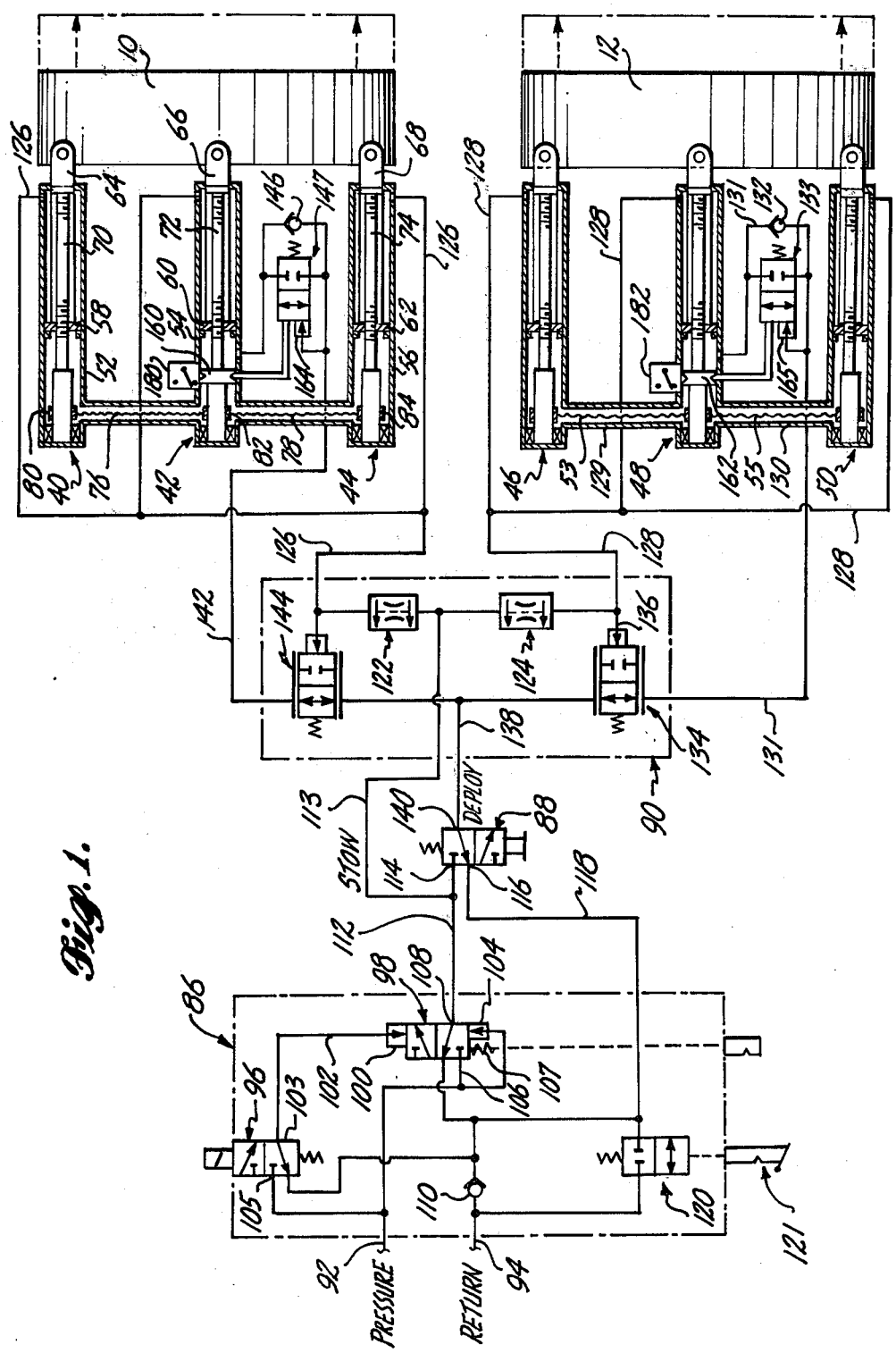
FIG. 1 is a schematic hydraulic diagram of the preferred embodiment of the hydraulic positioning and control system of the present invention.

Referring to FIG. 1, the preferred embodiment of the hydraulic positioning and control system of the present invention is illustrated schematically as it is employed in a high bypass turbofan jet engine to control the deployment of a pair of left- and right-hand fan thrust reverser cowls 10 and 12.

Figure 2:
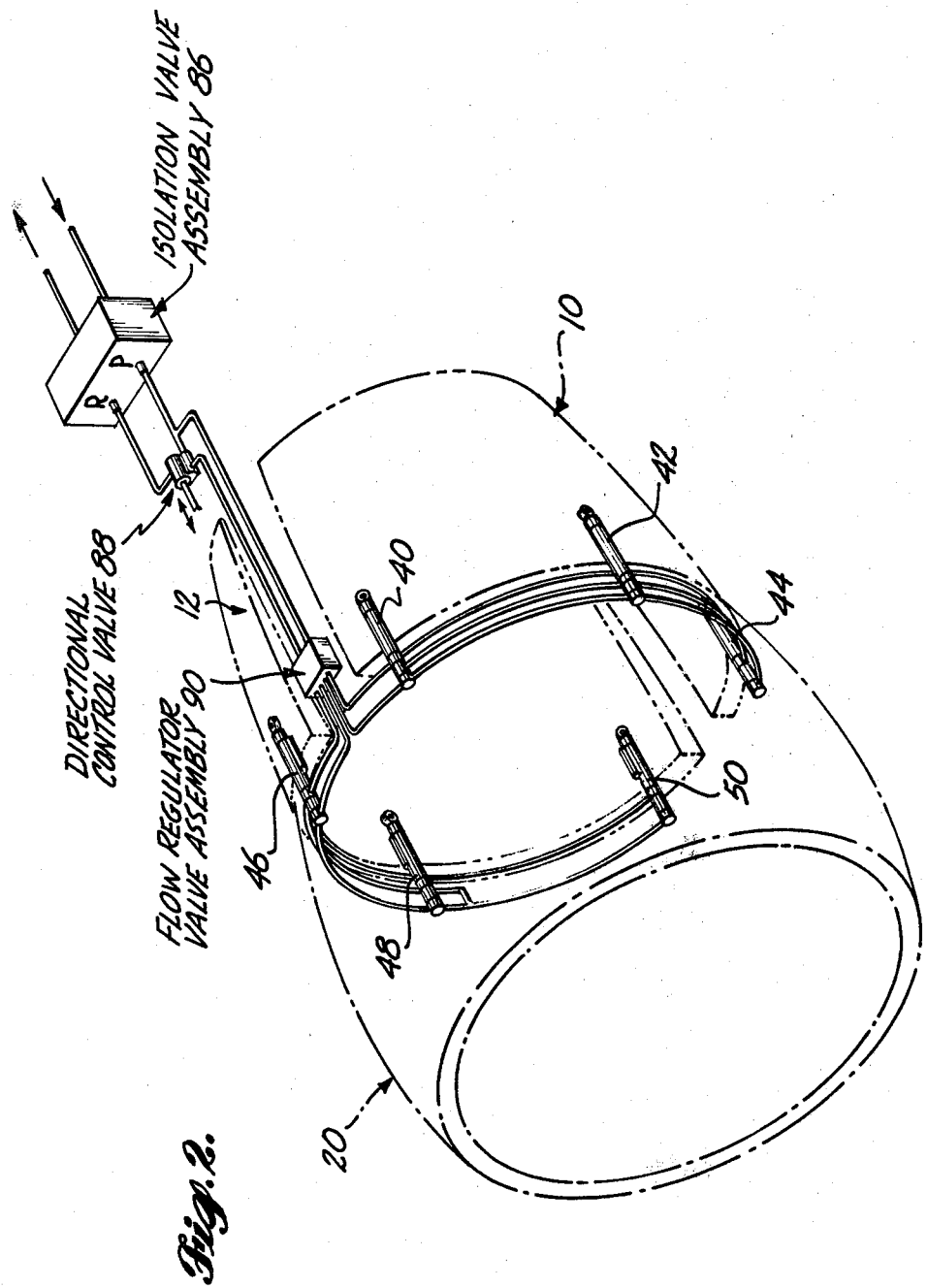
FIG. 2 is a pictorial view showing a portion of the fan housing and the thrust reverser cowls of a turbofan jet engine.
Figure 3:
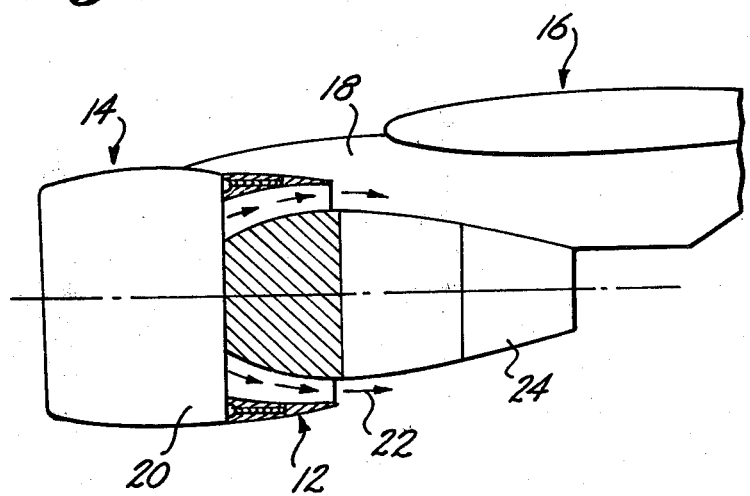
FIG. 3 is a schematic side view in partial cross section of a turbofan engine, with the right-hand thrust reverser cowl in the stowed positions.
Figure 4:
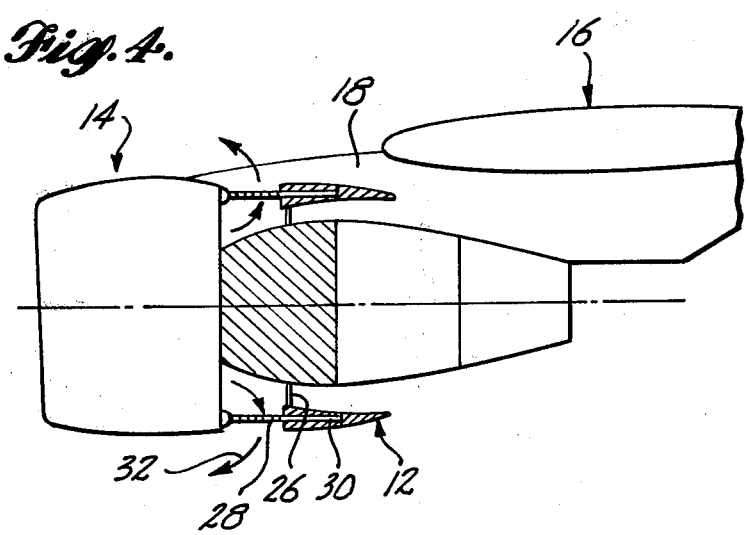
FIG. 4 is a cross-sectional view as in FIG. 3, with the thrust reverser cowl shown in its deployed positions.

The operation and deployment of the fan thrust reverser cowls 10 and 12 are illustrated in FIGS. 2 through 6. Referring, for example to FIGS. 3 and 4, the right-hand thrust reverser cowl 12 is viewed from the side as it is employed in a high bypass turbofan jet engine 14 affixed to an airplane wing 16 by a pylon 18. The cowl 12 is shown in its retracted, or stowed, position in FIG. 3. During normal operation, for example during takeoff or while in cruise, the thrust reverser cowl 12 forms a continuous rearward extension of the main fan housing 20. The reverser cowl 12 is faired with the fan housing 20 along both its inside and outside surfaces. Fan thrust, indicated by directional arrows 22, passes through the annular channel between the thrust reverser cowl 12 and the main body 24 of the turbine engine.

In FIG. 4, the fan thrust reverser cowl 12 is shown in a rearward, deployed position. Deployment of the reverser cowl 12 causes a set of blocker doors 26, which form part of the inside surface of the cowl 12 in the retracted position, to swing inwardly to block the annular channel between the cowl 12 and the main body 24 of the engine. At the same time, sets of fixed airflow turning vanes 28 are exposed. The vanes 28 are affixed to the fan housing 14 and are normally stowed within slots 30 in the thrust reverser cowl 12. The net effect of deploying the blocker doors 26 and the vanes 28 is to cause the fan thrust airflow to be deflected radially outwardly and forwardly, as indicated by the directional arrows 32 in FIG. 4.

Figure 5:
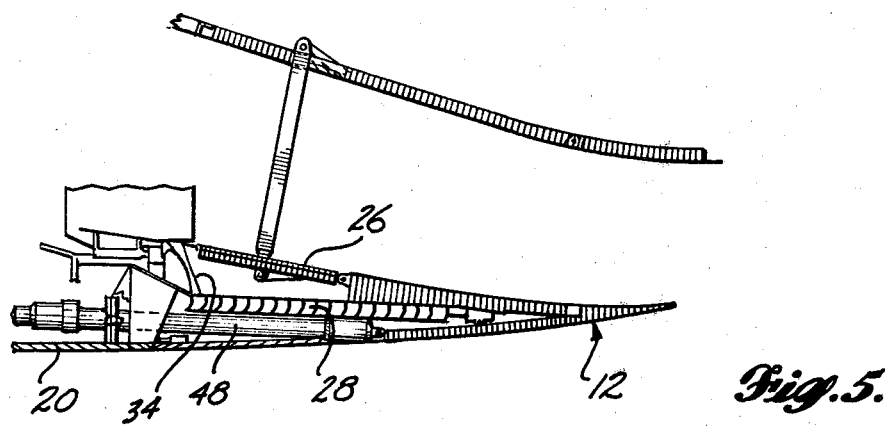
FIG. 5 is a cross-sectional view of the thrust reverser cowl in a stowed, or retracted, position.
Figure 6:
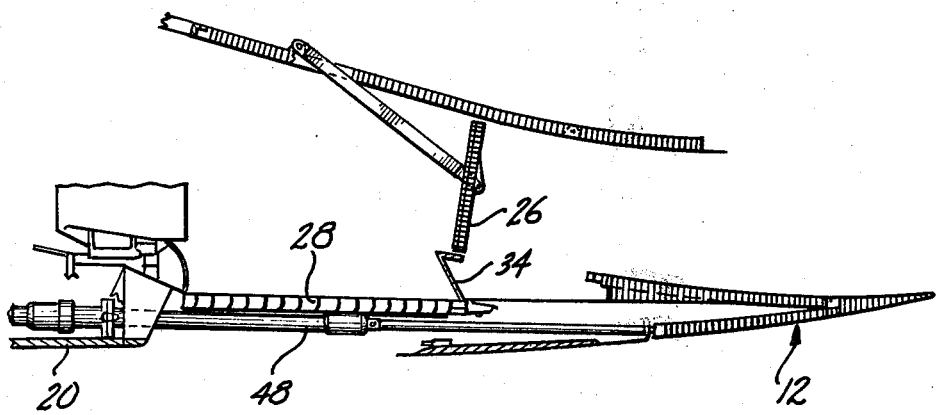
FIG. 6 is a cross-sectional view as in FIG. 5, with the thrust reverser cowl shown in a deployed position.

The operation of the blocker doors 26 and the thrust reverser cowl 12 are indicated in greater detail in FIGS. 5 and 6. With the cowl 12 retracted for cruise, the outer surface of the cowl 12 is smoothly faired with the outer surface of the main housing cowl 20, as indicated in FIG. 5, and the blocker door 26 forms a smooth extension of the inner surface of the cowl 12. As the cowl 12 is deployed rearwardly, as in FIG. 6, the blocker door 26 swings inwardly and is braced by strut 34.

Referring to FIGS. 1 and 2, the left-hand reverser cowl 10 is actuated by three double acting, single rod, linear hydraulic actuators 40, 42, and 44 which are mechanically linked in a manner described below. Likewise, the right-hand reverser cowl 12 is driven by three double acting, single rod, actuators 46, 48, and 50 which are spaced around the semicircular leading edge of the reverser cowl 12 and affixed to the trailing edge of the fan housing 20.

Referring to FIG. 1, the actuators 40, 42 and 44 of the left-hand reverser cowl 10 include cylinders 52, 54 and 56, which are affixed to the fan housing 20, and movable pistons 58, 60 and 62, respectively. Extending rearwardly from the pistons are piston rods 64, 66 and 68, respectively, which are attached at their opposite ends to the reverser cowl 10.

The pistons of the inner hydraulic actuators 40, 42 and 44 are mechanically linked together so as to be constrained to move synchronously. More specifically, the actuators include acme screws 70, 72 and 74, which are threaded to their associated pistons 58, 60 and 62, respectively. Linear translation of the pistons 58 through 62 results in rotation of the acme screws 70 through 74. The acme screws 70, 72 and 74 are linked to one another by flexible synchronization shafts 76 and 78, which are connected to the acme screws by means of worm gear assemblies 80, 82 and 84. The function of the acme screws and the flexible synchronization shafts is to constrain the pistons and rods of the hydraulic actuators 40 through 44 to move synchronously and in tandem at all times. As a result, the thrust reverser cowl 10 is evenly deployed and retracted with a smooth translational motion.

The operation of the hyraulic actuators 46, 48 and 50 associated with the right-hand reverser cowl 12 is identical to that described above with respect to the actuators 40 through 44 of the left-hand reverser cowl 10, i.e., the rods of the actuators 46 through 50 are mechanically linked by flexible synchronization shafts 53 and 55.

The hydraulics of the actuator assemblies for the left- and right-hand reverser cowls 10 and 12 are also identical. Accordingly, the following description of the hydraulics of the right-hand reverser cowl 12 is applicable also to the hydraulics of the actuators 40 through 44 associated with the left-hand cowl 10.

The positioning and control system includes generally an isolation valve assembly 86, a directional control valve 88 and a flow regulator valve assembly 90. These assemblies are each described in greater detail below. Briefly, the function of the isolation valve assembly 86 is to isolate the entire positioning and control system from the main airplane hydraulic system at times when the thrust reverser cowls are not actually being deployed or retracted. During such times, the positioning and control system for the reverser cowls is depressurized and isolated from the main hydraulics system, and the hydraulic actuators 40 through 50 and their associated reverser cowls 10 and 12 are locked in position with locking mechanisms described in greater detail below.

The directional control valve 88 selectively meters hydraulic fluid to the actuators to deploy or retract the reverser cowls 10 and 12. The flow regulator assembly 90 operates to cause the left- and right-hand reverser cowls 10 and 12 to be deployed or retracted synchronously and in parallel alignment. To deploy or retract the reverser cowls, the pilot must first arm the solenoid-actuated isolation valve assembly 86 and then actuate the directional control valve assembly 88. These assemblies are each described in greater detail below.

The isolation valve assembly 86 is connected to system pressure and return hydraulic lines 92 and 94 which are connected in turn to the main airplane hydraulic system. The pressure line 92 is ordinarily maintained at the system operating pressure of approximately 3,000 psi and the system return line 94 is ordinarily at the negligible pressure of the airplane hydraulic return system.

The isolation valve assembly 86 includes a two-position, three-way solenoid valve 96 and a double-piloted, two-position, three-way arming valve 98. The arming valve 98 includes a pilot port 100 which is connected by a hydraulic line 102 to an output port 103 of the solenoid valve 96. A second pilot port 104 of the arming valve 98 is connected to the system pressure line 92. As indicated schematically in FIG. 1, the pilot piston associated with pilot port 100 is larger than the pilot piston associated with the pilot port 104 so as to obtain an effective pressure biasing of the piloted arming valve 98 when both ports 100 and 104 are equally pressurized. The system pressure line 92 is also connected to an input port 105 of the solenoid valve 96 and an input port 106 of the arming valve 98.

In the absence of electrical actuation of the solenoid valve 96 by its associated solenoid, the solenoid valve 96 is spring biased to a closed position wherein the hydraulic line 102 and the pilot port 100 are closed to the system pressure line 92 and open to the return line 94. Thus, the absence of actuation of the solenoid, the pressure actuated pilot of port 104, together with an auxiliary bias spring 107, operate to maintain the arming valve 98 in a closed position wherein an output port 108 is closed to the system pressure line 92 and open to the system return line 94 via a one-way check valve 110. The auxiliary spring 107 operates further to maintain the arming valve 98 in this closed position in the event of a failure of system pressure in line 92. The output port 108 of the arming valve is connected to a hydraulic line 112 which, when pressurized at the system pressure, operates to retract the reverser cowls 10 and 12 to the stowed position, as described further below.

Upon electrical actuation of the solenoid of solenoid valve 96, the system pressure line 92 is connected in fluid communication with the hydraulic line 102. The resulting pressurization of the pilot of port 100 overpowers the smaller pilot of port 104 and the auxiliary bias spring 107 to open the arming valve 98. Upon opening of the arming valve 98, the system pressure line 92 is connected in fluid communication via port 108 with the hydraulic line 112. With the arming valve 98 opened and the hydraulic line 112 thereby pressurized at system pressure, the thrust reverser cowls 10 and 12 may be selectively deployed or retracted, as described below.

The directional control valve 88 is a two-position, spring biased, three-way valve. The hydraulic pressure line 112 from the isolation valve assembly 86 is connected to one input port 114 of the directional control valve 88. A second port 116 of the valve 88 is connected to a hydraulic return line 118, which is connected to the system return line 94 through the one-way check valve 110 in the isolation valve assembly 86. A two-position, two-way, spring biased manual bypass valve 120 is also interposed between the return hydraulic line 118 and the system return line 94 in the isolation valve assembly 86. The bypass valve 120 includes an external locking mechanism 121 by which the return line 118 may be kept open to the system return line 94 during servicing or maintenance.

A hydraulic pressure line 113 (also labelled STOW) is connected to line 112 and bypasses the directional control valve 88 and passes into the flow regulator assembly 90 where it is connected to each of two two-way flow regulator valves 122 and 124. The flow regulator valves 122 and 124 are pressure compensated and matched with one another so as to conduct fluid flow in either direction at substantially constant flow rates over pressure ranges of approximately 100 psi to 4,000 psi. Hydraulic fluid passing through the flow regulator valve 122 from the pressure line 113 passes through a hydraulic line 126 to the rod ends of the hydraulic actuators 40, 42 and 44 associated with the left-hand reverser cowl 10. Likewise, hydraulic fluid passing through the regulator valve 124 from the pressure line 113 passes through a hydraulic line 128 and is distributed therefrom to the rod ends of the hydraulic actuators 46, 48 and 50 of the right-hand reverser cowl 12. Thus, with the isolation valve assembly 86 opened and the directional control valve 88 in its normal spring biased position, as illustrated in FIG. 1, pressurized hydraulic fluid is applied to the rod ends of the hydraulic actuators to thereby retract the rods of the actuators and move the thrust reverser cowls 10 and 12 toward their stowed positions.

Referring to the actuators 46, 48 and 50 of the right-hand reverser cowl 12 in FIG. 1, the head ends of the actuators 46 through 50 are connected in fluid communication with one another through conduits 129 and 130 enclosing the flexible synchronizaion shafts 52 and 54, respectively. Hydraulic fluid is provided to and exhausted from the head ends of the actuators 46 through 50 through a hydraulic line 131 having a one-way check valve 132 and a lock valve 133 interposed in parallel therein. The hydraulic line 131 is connected to one port of a pressure limiting valve 134 in the flow regulator assembly 90. The pressure limiting valve 134 is a variable, spring biased, piloted valve. The pilot of the pressure limiting valve 134 is connected in fluid communication to hydraulic line 128 by hydraulic line 136. The second port of the pressure limiting valve 134 is connected to a hydraulic line 138, also labelled DEPLOY, which is in turn connected to a port 140 of the directional control valve 88.

Likewise, the common head ends of the actuators 40, 42 and 44 of the left-hand reverser cowl 10 are connected by a hydraulic line 142 to a second pressure limiting valve 144 through a check valve 146 and a lock valve 147. The hydraulic line 138 connects the second port of the pressure limiting valve 144 to port 140 of the directional control valve 88.

The actuator assemblies of reverser cowls 10 and 12 further include mechanical locking mechanisms 160 and 162 which are mechanically connected to the lock valves 147 and 133, respectively. The lock valves 147 and 133 are two-position, two-way, spring biased piloted valves which are mechanically linked to the locking mechanisms 160 and 162. Pressurization of the hydraulic lines 138, 131, and 142 pressurizes pilot ports 164 and 165 and thereby opens the lock valves 147 and 133, and also operates to unlock the locking mechanisms 160 and 162 to free the actuators for translational movement. If the pressure in the hydraulic lines 131 and 142 drops below a certain predetermined level, the bias springs of the lock valves 147 and 133 operate to close the valves, lock the locking mechanisms 160 and 162, and thereby restrict flow of fluid in the hydrualic lines 131 and 142 to the direction permitted by the check valves 132 and 146. In effect, the lock valves 133 and 147, when actuated by sufficient pressure in the hydraulic lines 131 and 142, operate to unlock the locking mechanisms 160 and 162 and also permit fluid to bypass the check valves 146 and 132 to permit flow of hydraulic fluid to the head ends of the reverser cowl actuators 40 through 50.

To operate the positioning and control system illustrated in FIG. 1, an electrical signal is first transmitted to the solenoid of the valve 96 in the isolation valve assembly 86. This admits pressurized hydraulic fluid to hydraulic line 102 and pilot port 100 and thereby opens the arming valve 98 to connect the hydraulic lines 112 and 113 (STOW) to the system pressure line 92. Pressurization of hydraulic line 112 with the directional control valve 88 in its normal spring biased position (as shown) results in pressurization of the rod ends of the reverser cowl actuators 40 through 50 through lines 126 and 128 and thereby retracts the reverser cowls 10 and 12. More specifically, if the reverser cowls are in a deployed position, pressurization of hydraulic lines 112 and 113 by actuation of the isolation valve assembly 86 results in constant flow rates of fluid through the regulator valves 122 and 124 and thence through hydraulic lines 126 and 128 to the rod ends of all of the hydraulic actuators 40 through 50. Since the flow rates to the two sets of hydraulic actuators are substantially identical, and since the hydraulic actuators of each set are mechanically linked, a uniform and synchronous motion of the left- and right-hand reverser cowls 10 and 12 is achieved. The left- and right-hand reverser cowls 10 and 12 are retracted until they are in their fully stowed positions at the ends of their displacement strokes. During the retraction of the reverser cowls 10 and 12, hydraulic fluid is exhausted from the head ends of the actuators 40 through 50 through hydraulic lines 131 and 142, thence through the pressure limiting valves 134 and 144, thence through the common hyraulic line 138 and the directional control valve 88, and finally through the hydraulic return line 118 to the system return line 94. During exhaustion of fluid from the head ends of the actuators 40 through 50, the hydraulic lines 131 and 142 are at or near the pressure of the system return line 94, such that the pilot ports 164 and 165 of the lock valves 147 and 133 are depressurized, such that the valves 147 and 133 are closed and the fluid is constrained to flow through the one-way check valves 132 and 146. When the left- and right-hand reverser cowls 10 and 12 reach the ends of their displacement strokes, the locking mechanisms 160 and 162 automatically lock the central actuators 42 and 48 to thereafter maintain the reverser cowls mechanically locked in the stowed or retracted position until such later time as the hydrualic lines 131 and 142 are pressurized for deployment of the cowls 10 and 12. A pair of lock indication switches 180 and 182 provide an electrical signal indicating the locked condition of the actuators 42 and 48.

With the reverser cowls 10 and 12 fully retracted and mechanically locked in place, the entire system may be depressurized by deactuation of the isolation valve assembly 86, with the locking mechanisms 160 and 162 retaining the reverser cowls in the stowed position. The system is normally maintained in this condition during flight.

To deploy the reverser cowls 10 and 12 from their stored positions, for example during landing of the airplane, the isolation valve assembly 86 is actuated to pressurize hydraulic line 112 as before. The directional control valve 88 is also actuated to thereby connect ports 114 and 140 of the valve 88 and thereby connect hydraulic line 138 to the pressurized hydraulic line 112. Thus, hydraulic lines 112, 113 and 138 are all pressurized to effect deployment of the reverser cowls. As a result of pressurization of hydraulic fluid in line 138, and thus also in lines 131 and 142, the piloted locking valves 147 and 133 are opened to connect the head ends of the actuators 40 through 50 to the hydraulic lines 142 and 131. Actuation of the piloted locking valves 147 and 133 also operates to unlock the locking mechanisms 160 and 162 and frees the actuators 40 through 50 for deployment. It will be seen that this results in pressurization of both the rod ends and the head ends of the actuators 40 through 50. The areas of the pistons facing the head ends of the actuators 40 through 50 are each approximately twice as great as the areas of the pistons facing the rod ends of the actuators. Accordingly, equal pressurization of the head and rod ends of the actuators 40 through 50 results in a net deployment force which acts to extend the rods and thereby deploy the reverser cowls 10 and 12 rearwardly. During deployment of the cowls 10 and 12, hydraulic fluid is exhausted from the rod ends of the actuators 40 through 50 through the hydraulic lines 126 and 128 and thence through the two-way flow regulator valves 122 and 124. The flow regulator valves 122 and 124 thus operate to constrain the deployment of the reverser cowls 10 and 12 at equal and synchronous rates. The fluid flow through the flow regulator valves 122 and 124 is combined in and passes through hydraulic line 113. This combined fluid flow in line 113 is further combined with hydraulic fluid flowing through the line 112 from the isolation valve assembly 86. These combined flows of hydraulic fluid in lines 113 and 112 together make up the net fluid flow through the directional control valve 88 and thence through the hydraulic line 138.

Referring again to FIGS. 3 through 6, it will be seen that during deployment of the reverser cowls, the fan thrust (22) engages the inwardly swinging blocker doors 26 to result in the reverser cowls 10 and 12 being effectively pulled rearwardly. The combined force arising from the fan thrust on the blocker doors 26 and the pressure of the hydraulic fluid in the head ends of the actuators 40 through 50 can result in excessive pressures building up in the rod ends of the actuators 40 through 50. That is, although it is necessary to drive the reverser cowls rearwardly by pressurization of the head ends of the actuators 40 through 50 in the initial stages of deployment, in the later stages the fan thrust engages the emerging blocker doors 26 to effectively drive the reverser cowls rearwardly without any need for pressurization of the head ends of the actuators 40 through 50 and actually placing a substantial rearward air load on the reverser cowls. In the event this combination of air and hydraulic loads produces excessive pressure buildup in the rod ends of the actuators 40 through 50, the pressure limiting valves 134 and 144 of the flow regulator assembly 90 are actuated to restrict the pressure of fluid flowing from the common line 138 to the hydraulic lines 131 and 142 leading to the head ends of the actuators 40 through 50. Accordingly, the hydraulic pressure in the head ends of the actuators is reduced to thereby reduce the pressure in the rod ends to acceptable levels.

In other embodiments of the invention, the flow regulator valves 122 and 124 could be interposed in hydraulic lines connected to the head ends of the actuators 40 through 50, rather than in the hydraulic lines connected to the rod ends as in the preferred embodiment. In such embodiments, the pressure limiting valves would not be required because the flow regulator valves would assume the function of the pressure limiting valves to some extent and reduce the pressure of the fluid applied to the head ends of the actuators. However, under the load conditions commonly encountered in the turbofan engines for which the present system was developed, the pressure applied to the head ends of the actuators during deployment of the reverser cowls could occasionally fall below the level at which the lock valves 147 and 133 are actuated by their associated biasing springs, thus resulting in stoppage of flow to the head end of the actuators and stalling of the reverser cowls in midstroke. To avert this possiblity, in the preferred embodiment of the positioning and control system, the flow regulator valves 122 and 124 are interposed in the hydraulic line connected to the rod ends of the actuators 40 through 50. In other similar applications, however, the flow regulator valves 122 and 124 could be equally well placed and the hydraulic lines connected to the head ends of the actuators.

Although the present invention is described and illustrated herein by reference to a preferred embodiment, it will be understood that various modifications, alterations and substitutions may be made without departing from the spirit of the invention. Accordingly, the scope of the invention is defined by the following claims.

The embodiments of the invention in which an exclusive property or privilege is claimed are defined as follows:

1. A pressurized hydraulic fluid positioning and control system for moving first and second fan thrust reverser cowls in a turbofan engine, said fan thrust reverser cowls being movable in retraction and deployment between a retracted position and a deployed position, respectively, comprising:

first and second hydraulic actuator means coupled respectively to said first and said second reverser cowls for moving said cowls between said retracted and deployed positions, each of said first and second hydraulic actuator means including at least one double-acting hydraulic actuator having cooperative piston and cylinder members and a movable piston rod, said piston rod of said hydraulic actuator of said first hydraulic actuator means being coupled to said first reverser cowl, and said piston rod of said hydraulic actuator of said second hydraulic actuator means being coupled to said second reverser cowl, each said cylinder member being affixed to said turbofan engine and having a rod end pressurizable to retract said cowls and a head end pressurizable to deploy said cowls;

means for supplying pressurized hydraulic fluid to said first and said second hydraulic actuator means;

directional control valve means for selectively controlling flow of said pressurized hydraulic fluid to and from said first and second hydraulic actuator means to retract or deploy said thrust reverser cowls; and, first and second flow regulator means respectively coupled to said first and second actuator means for regulating flow of said pressurized hydraulic fluid to and from said first and second actuator means during deployment and retraction of said first and second reverser cowls, said first and second flow regulator means being operable to regulate the respective rates of flow of hydraulic fluid to and from said first and second hydraulic actuator means to provide substantially synchronous and independent movement of said first and second reverser cowls during retraction and deployment.

2. The positioning and control system defined in claim 1 wherein said first and second flow register means each comprise a single two-way flow regulator valve connected for coupling said pressurized hydraulic fluid to and from the rod ends of the associated cylinder members, said flow regulator valves being operable to regulate and equalize the translational rates of said reverser cowls throughout the full range of motion during both retraction and deployment.

3. The positioning and control system defined in claim 2 further comprising first and second pressure limiting valve means associated respectively with said first and second hydraulic actuator means, said pressure limiting valve means being responsive respectively to pressure in said rod ends of said actuators and operable to reduce pressure applied to said head ends in response to pressure in said rod ends exceeding a predetermined maximum pressure during deployment of said thrust reverser cowls.

4. The positioning and control system defined in claim 1, 2 or 3 further comprising an isolation valve assembly for depressurizing said hydraulic actuator means and isolating said actuator means and said directional control valve means from said source of pressurized hydraulic fluid, and lock valve means operable to mechanically lock said thrust reverser cowls in said retracted position upon said actuator means being depressurized.

5. The positioning and control system defined in claim 3 further comprising a piloted lock valve and a check valve in parallel for supplying said pressurized hydraulic fluid to said head end of each said hydraulic actuator when the pressure exhibited by said pressurized hydraulic fluid is at least equal to a predetermined minimum pressure, said lock valve being responsive to said pressurized hydraulic fluid to open said lock valve and bypass said check valve when said pressurized hydraulic fluid is at least equal to said predetermined minimum pressure, said check valve being a one-way check valve permitting only exhaustion of fluid from said head end of each said hydraulic actuator, said positioning and control system further comprising a mechanical locking mechanism coupled to said lock value and operable to lock said actuator with the reverser cowl in said retracted position when said lock valve is closed.

* * * * *

UNITED STATES PATENT AND TRADEMARK OFFICE
CERTIFICATE OF CORRECTION

PATENT NO. : 4,391,409
DATED : July 5, 1983
INVENTOR(S) : Klaus H. Scholz

It is certified that error appears in the above-identified patent and that said Letters Patent is hereby corrected as shown below:

Column 1, line 40, "of" (first occurrence) should be --by--
Column 2, line 27, "both" should be --both--
Column 3, line 45, "of" (first occurrence) should be --or--
Column 5, line 26, "inner" should be --linear--
Column 9, line 11, "stored" should be --stowed--
Column 11, line 21, "register" should be --regulator--

Signed and Sealed this

Twenty-first Day of February 1984

[SEAL]

Attest:

GERALD J. MOSSINGHOFF

Attesting Officer    Commissioner of Patents and Trademarks